United States Patent [19]

Lee

[11] Patent Number: 6,104,605
[45] Date of Patent: Aug. 15, 2000

[54] COVER STRUCTURE FOR A NOTEBOOK COMPUTER

[75] Inventor: Chen-Fu Lee, Sanchung, Taiwan

[73] Assignee: Yen-Chi Hsieh, Taipei Hsien, Taiwan

[21] Appl. No.: 09/047,064

[22] Filed: Mar. 24, 1998

[30] Foreign Application Priority Data

Mar. 28, 1997 [TW] Taiwan ................................ 86204818

[51] Int. Cl.[7] ...................................................... G06F 1/16
[52] U.S. Cl. ...................... 361/681; 312/223.1; 248/917; 49/466
[58] Field of Search ..................................... 361/681, 682; 312/223.1, 223.2; 248/917–924; 49/466, 479.1

[56] References Cited

U.S. PATENT DOCUMENTS 5,586,002 12/1996 Notarianni ............................. 361/681

Primary Examiner—Leo P. Picard
Assistant Examiner—Yean-Hsi Chang
Attorney, Agent, or Firm—William E. Pelton, Esq.

[57] ABSTRACT

A cover structure for a notebook computer includes a base casing shaped as a flat box having a front face and a lower side each defining an opening, an LCD being slid and received in the base casing as a drawer from the opening of the lower side of the base casing, and a fixing plate to be combined with the base casing so that the LCD is fixed therebetween. The cover structure is slim, can be easily produced and easily assembled.

6 Claims, 6 Drawing Sheets

COVER STRUCTURE FOR A NOTEBOOK COMPUTER

BACKGROUND OF THE INVENTION

1. Field of the Invention

The present invention relates to a notebook computer, more particularly, to a cover structure for the notebook computer, which is slim and is easily produced.

2. Description of Related Art

A conventional cover structure for a notebook computer is shown in FIG. 5. The cover structure comprises a front casing 81, a rear casing 82, and a liquid crystal display (LCD) 80 interposed therebeteween.

As can be seen in this drawing, the front casing 81 is shaped as a frame and has a plurality of engagement pieces 810 provided at a periphery edge thereof so that the front casing 81 can be combined with the rear casing 82.

The rear casing 82 has a plurality of tubes 820 each having a threaded bore provided at proper position, so that screws (not shown) extending through the LCD 80 and received in the threaded bores of the tubes 820 of the rear casing 82 can combine securely the LCD 80 and the rear casing 82.

The front casing 81 has two recesses 811, and the rear casing 82 has two recesses 821 corresponding to the recesses 811, respectively. When the front casing 81 is combined with the rear casing 82, two cavities are defined so that the cover can be pivotally engaged with a main body of the notebook computer. The engagement between the main body and the cover in commonly known, and therefore the detailed description thereof is omitted.

The thickness of such a cover structure cannot be reduced since the cover structure is configured by the three layers (front casing 81, LCD 80 and rear casing 82) being laminated and combined.

In addition, the front casing 81 and the rear casing 82 have to be produced by means of two molds. The front casing 81 and the rear casing 82 must be coated to resist electromagnetic interference. Such a coating process is proceeded under a high temperature. The front casing 81 and the rear casing 82 have a number of engagement elements such as the engagement piece 810 and the tube 820. Those engagement elements with different shapes may become deformed to different degrees under the high temperature. Accordingly, gaps may exist after the front casing 81 and the rear casing 82 are combined. Furthermore, the assembly of such a conventional cover structure is somewhat troublesome.

SUMMARY OF THE INVENTION

One object of the present invention is to provide an improved cover structure for a notebook computer, the cover structure is slim.

Another object of the present invention is to provide an improved cover structure for a notebook computer, the cover structure can be easily produced and easily assembled.

A further object of the present invention is to provide an improved cover structure for a notebook computer, the cover structure is adapted for LCD's of different sizes.

In accordance with one aspect of the present invention, the cover structure comprises a base casing shaped as a flat box having a front face and an lower side each defining an opening; an LCD, which is slidably received in the base casing as a drawer from the opening of the lower side of the base casing; and a fixing plate to be combined with the base casing so that the LCD is fixed therebetween.

In accordance with another aspect of the present invention, the cover structure further comprises an upper blocking strip and two side blocking strips provided at edges of an upper side and two opposed sides of the base casing, respectively.

Other objects, advantages and novel features of the invention will become more apparent from the following detailed description when taken in conjunction with the accompanying drawings.

DETAILED DESCRIPTION OF PREFERRED EMBODIMENT

Figure 1:
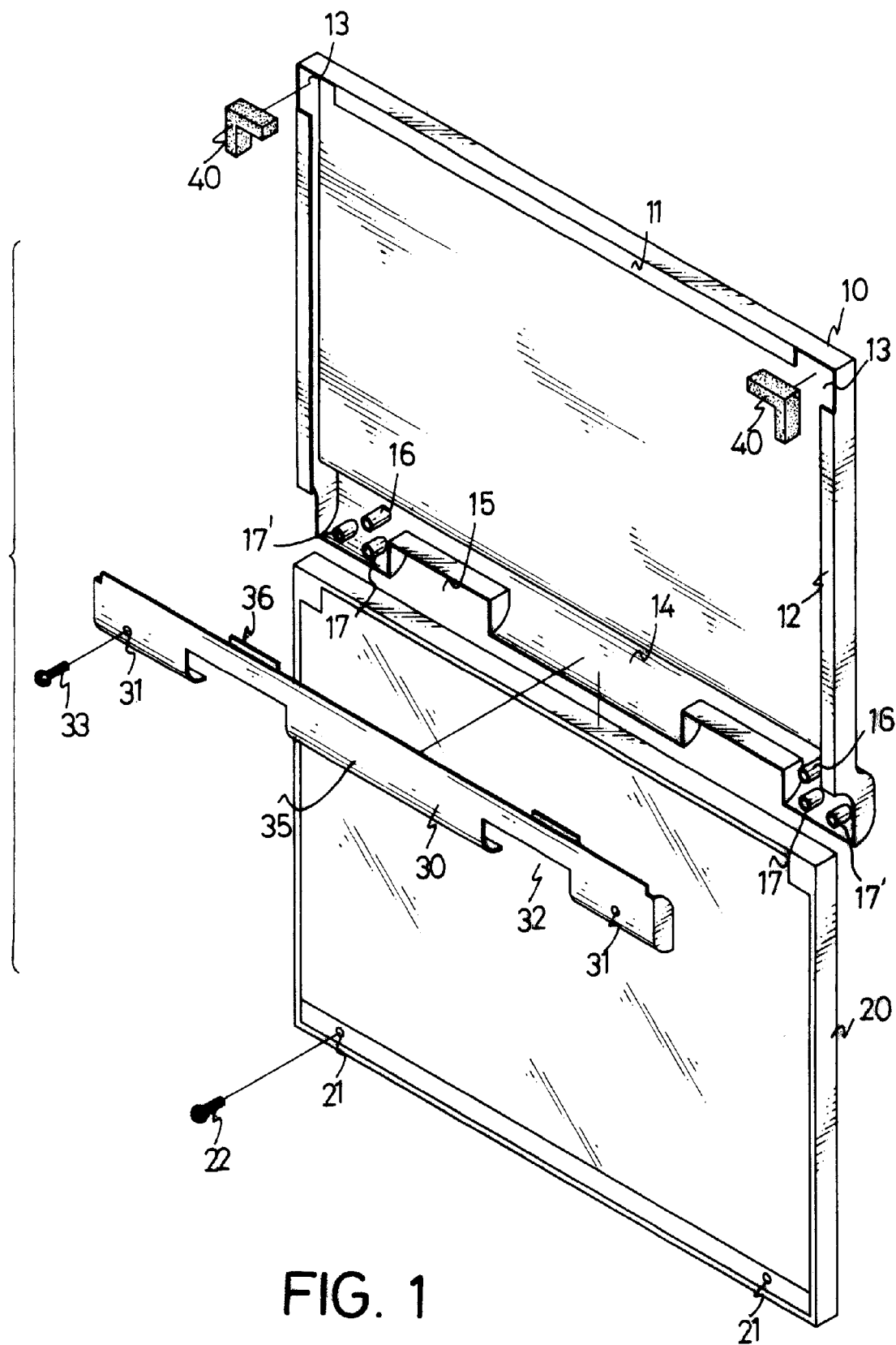
FIG. 1 is an exploded perspective view of a cover structure for a notebook computer in accordance with the present invention.
Figure 2:
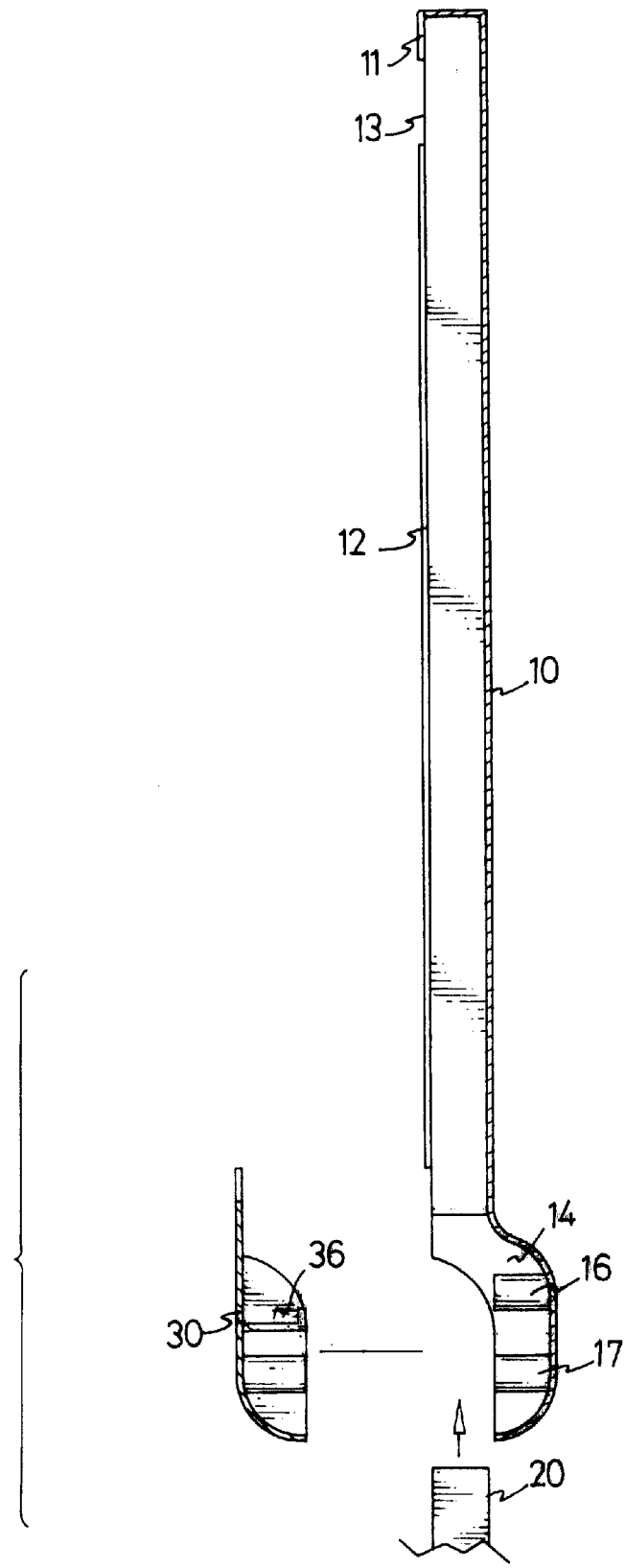
FIG. 2 is an exploded sectional side view of the cover structure in accordance with the present invention.

Referring to FIGS. 1 and 2, a cover structure for a notebook computer in accordance with the present invention comprises a base casing 10, an LCD 20, and a fixing plate 30.

The base casing 10 is shaped as a flat box having a rear plate, an upper side wall, a left side wall and a right side wall. A front face and a lower side of the base casing 10 each defines an opening.

In this embodiment, the base casing 10 has an upper blocking strip 11 provided at an edge of the upper side wall, and two side blocking strips 12 provided at edges of the left and right side walls thereof. In addition, a lower side of the base casing 10 extends away from the rear plate and the left and right side walls to define a channel. Accordingly, the lower side of the base casing 10 defines an opening.

The LCD 20 can be received in the base casing 10 by sliding it into the base casing 10 via the opening in the lower side of the base casing 10.

The base casing 10 has two recesses 15 defined at the lower side thereof. The channel of the base casing 10 has two lower corners each provided with a first tube 16 with a threaded bore and two second tubes 17, 17' with a threaded bore. The two second tubes 17 and 17' are utilized for connecting a hinge so that the cover structure can be assembled with the main body of the notebook computer. Such connection between the cover and the main body of the notebook computer is well known, and thereof the description thereof is omitted herein.

The LCD has two through holes 21 defined in positions corresponding to the first tubes 16.

The fixing plate 30 is long and narrow and has two recesses 32 corresponding to the recesses 15 of the base casing 10 and two through holes 31 corresponding to the second tube 17.

Figure 3:
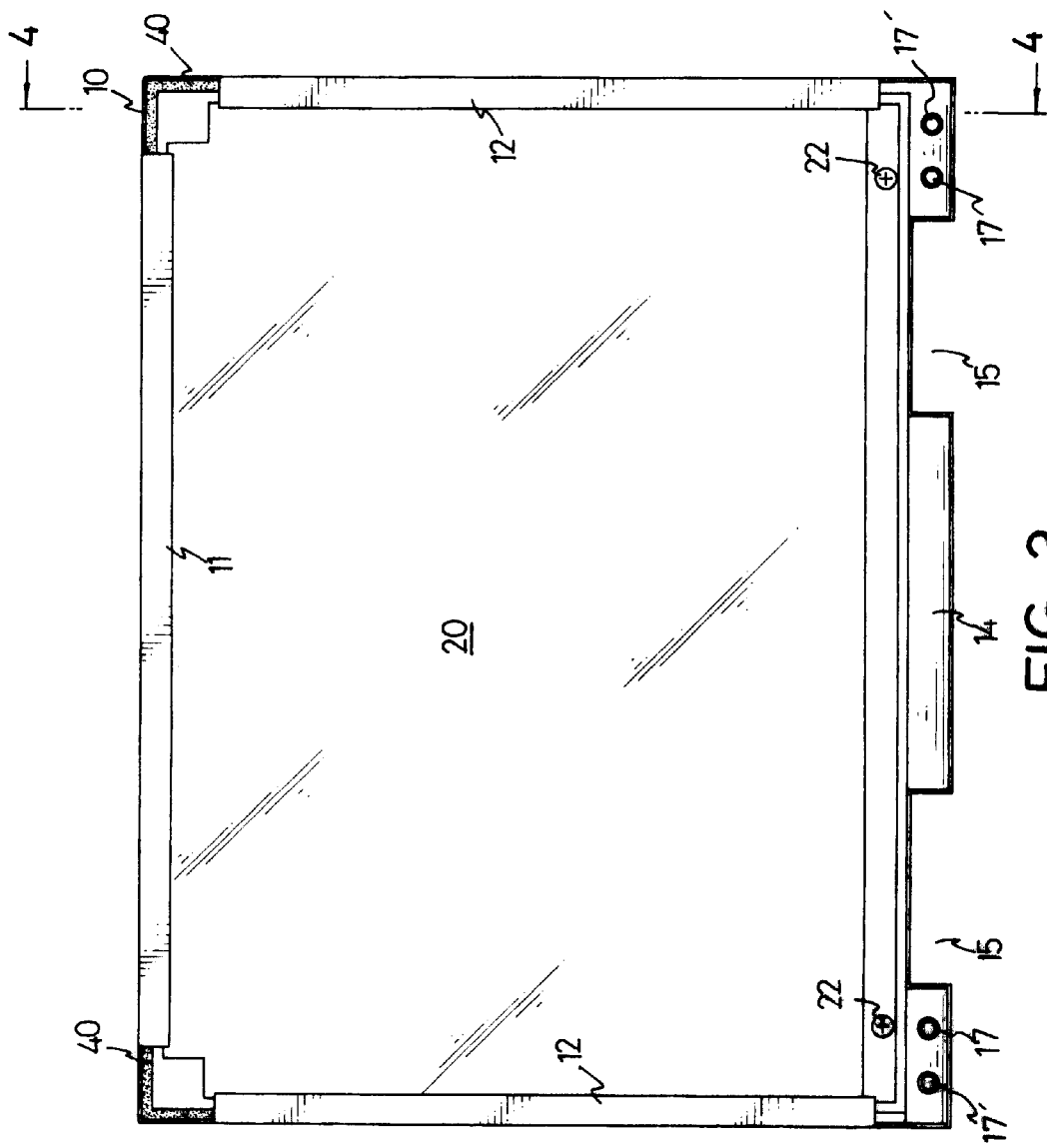
FIG. 3 is a front view of the cover structure in accordance with the present invention, wherein a fixing plate has not been mounted yet.

After sliding the LCD 20 into the base casing 10, the LCD 20 is fixed to the base casing 10 by two screws 22 being extended through the through holes 21 and screwed into the threaded bore of the first tubes 16, as shown in FIG. 3. It is noted that the LCD 20 can be fixed to the base casing 10 by any other suitable known method.

Figure 4:
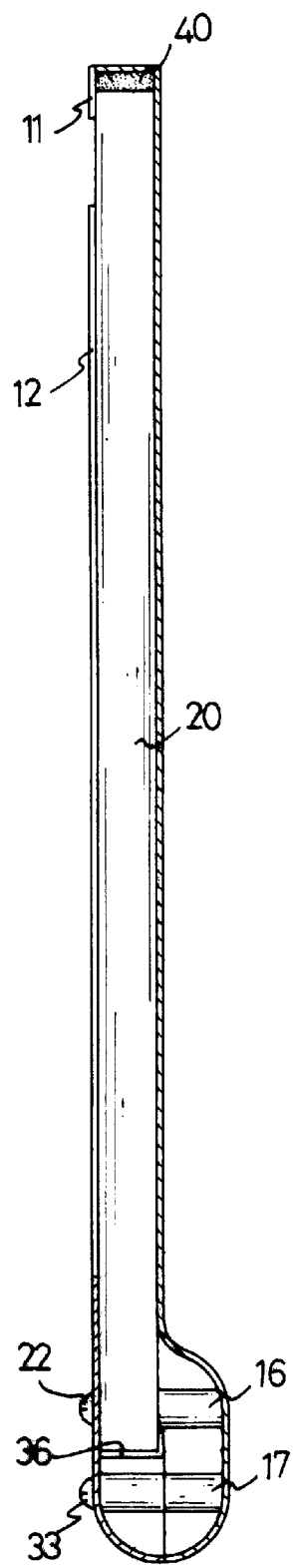
FIG. 4 is a sectional side view showing the cover structure in accordance with the present invention in assembly.
Figure 5:
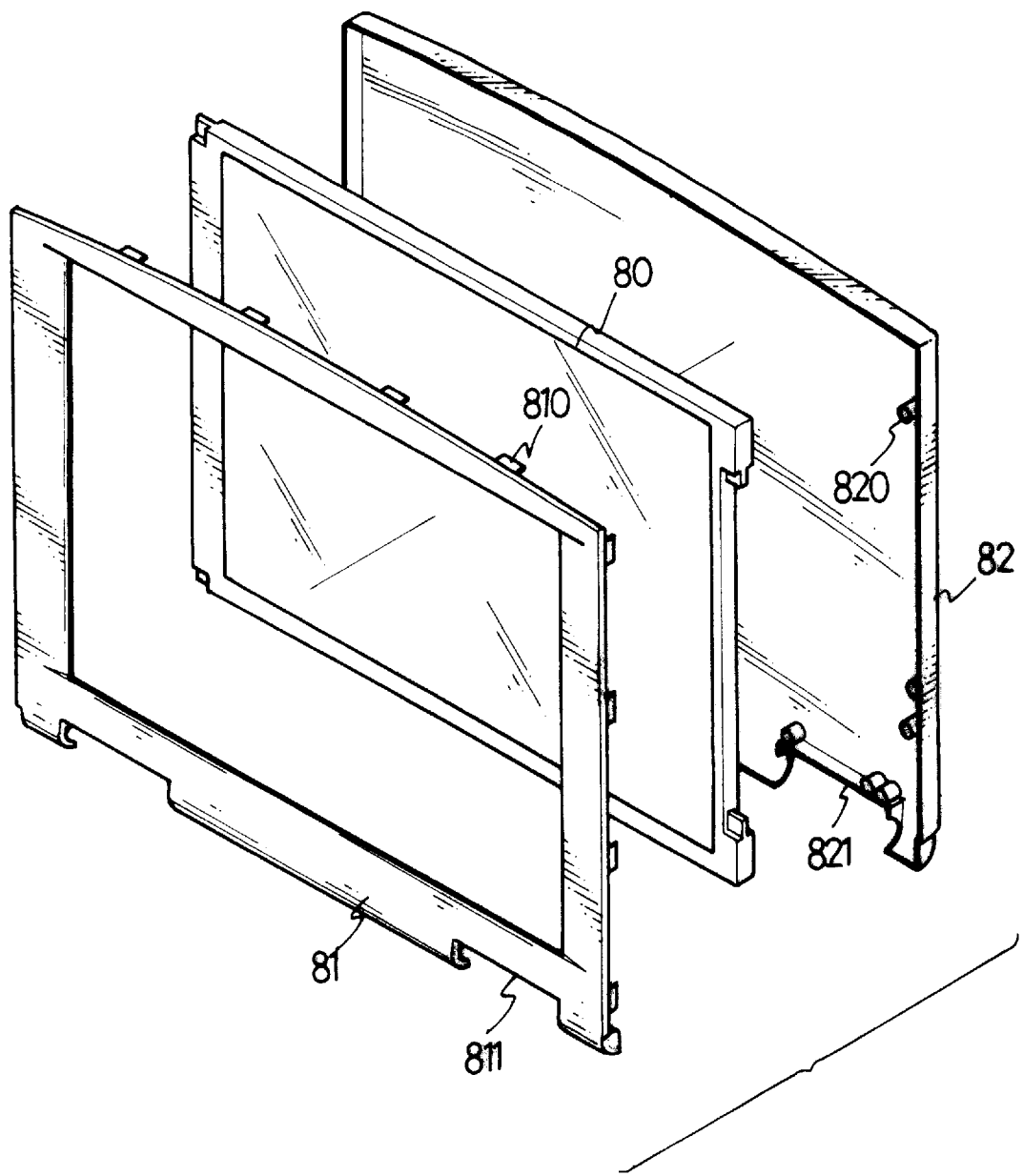
FIG. 5 shows a conventional cover structure for a notebook structure.

The fixing plate 30 is then combined with the base casing 10 by means of two screws 33 extended through the through holes 31 of the fixing plate 30 and being screwed into the threaded bores of the second tubes 17. A middle portion 35 between the two recesses 32 of the fixing plate 30 corresponds to a middle portion 14 between the two recesses 15. The assembled cover structure is shown in FIG. 4. It is noted that the fixing plate 30 can be combined with the base casing 10 in any other known manner.

The fixing plate 30 can further comprise one or more hooks 36 provided at proper positions to support the LCD 20 after the fixing plate 30 is combined with the base casing 10, as shown in FIGS. 1, 2, 4.

Referring to FIGS. 1, 3 and 4, the upper blocking strip 11 is shorter than the upper side of the base casing 10, and each of the side blocking strips 12 is shorter than the left or right side of the base casing 10. Accordingly, a space 13 is defined at each of two upper corners of the base casing 10.

The cover structure in accordance with the present invention can further comprise two corner buffer pieces 40, which can be made of plastics, rubber or other suitable buffer material. The two corner buffer pieces 40 are forced in the two spaces 13, respectively, so as to securely and stably fix the LCD 20. Each of the corner buffer pieces 40 is shaped as an "L" as shown. Since the corner buffer pieces 40 are made of flexible material such as rubber, another LCD can be securely and stably fixed in the base casing even if it has a size slightly different to the LCD 20.

Figure 6:
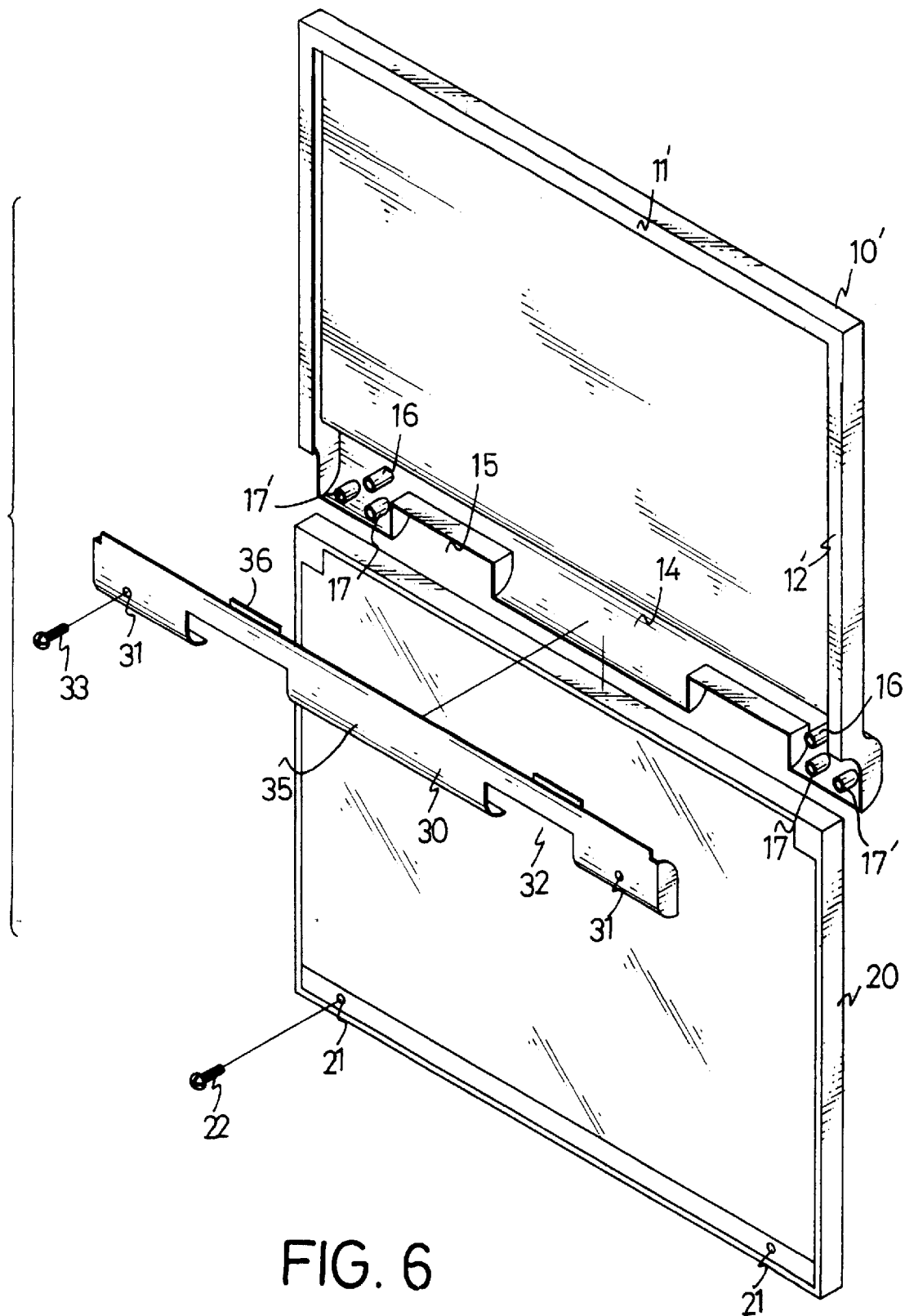
FIG. 6 shows another embodiment of the cover structure in accordance with the present invention.

Alternatively, as shown in FIG. 6, another type of the base casing 10' can be used. In this embodiment, the difference from the first embodiment is that the base casing 10' has an upper block strip 11' and two side block strip 12' connected as a continuous flange.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover structure for a notebook computer, comprising:

a base casing shaped as a flat box having a rear plate, an upper side wall, a left side wall and a right side wall, a front face and a lower side thereof each defining an opening, said base casing having an upper blocking strip provided at an edge of said upper side wall and two side blocking strips provided at edges of the left and right side walls, the respective blocking strips being shorter than the edges of the side walls so that a space is defined between the upper blocking strip and each of said two side blocking strips;

a liquid crystal display (LCD) slid into said base casing from said opening of the lower side of the base casing to be received therein; and a fixing plate combined with said base casing to fasten the LCD therebetween.

2. The cover structure as claimed in claim 1, further comprising two corner buffer pieces each being forced into one of the spaces.

3. The cover structure as claimed in claim 2, wherein each of said corner buffer pieces is made of flexible material.

4. The cover structure as claimed in claim 1, wherein the base casing has a plurality of first tubes with threaded bore extending from the lower side thereof, the LCD having a plurality of through holes corresponding to the first tubes and being fixed to the base casing by screws extending through said through holes and into said threaded bores of the first tubes, respectively.

5. The cover structure as claimed in claim 1, wherein said base casing has a plurality of second tubes with threaded bores extending form the lower side thereof, the fixing plate having a plurality of through holes corresponding to the second tubes and being combined with the base casing by screws extends through said through holes and into said threaded bores of the second tubes, respectively.

6. The cover structure as claimed in claim 1, wherein said fixing plate has at least one hook for supporting the LCD.

* * * * *